United States Patent [11] 3,633,883

| [72] | Inventor | Raymond D. McGlothlin<br>Box 246, Talco, Tex. 75487 |
| [21] | Appl. No. | 773,076 |
| [22] | Filed | Nov. 4, 1968 |
| [45] | Patented | Jan. 11, 1972 |

[54] SUPPORTING AND SEALING MEANS FOR TREATING TRAYS IN FLUID-TREATING APPARATUS
2 Claims, 10 Drawing Figs.

| [52] | U.S. Cl. | 261/114 |
| [51] | Int. Cl. | B01f 3/04 |
| [50] | Field of Search | 202/158, 153; 261/114, 113 |

[56] References Cited
UNITED STATES PATENTS

| 249,528 | 11/1881 | Isbell | 261/113 |
| 2,029,277 | 1/1936 | Scoville | 261/114 |
| 2,917,293 | 12/1959 | Mendelsohn et al. | 261/114 |
| 1,620,751 | 3/1927 | Bartlett | 261/114 |
| 2,690,332 | 9/1954 | Jorgensen | 261/114 |
| 2,855,187 | 10/1958 | Rector | 261/114 |
| 3,047,278 | 7/1962 | Streuber | 261/114 |
| 3,053,520 | 9/1962 | Streuber | 261/114 |
| 3,162,699 | 12/1964 | Sivyer | 202/158 |
| 3,345,049 | 10/1967 | McGlothlin | 202/158 |

FOREIGN PATENTS

| 805,058 | 11/1958 | Great Britain | 261/114 |

*Primary Examiner*—Frank W. Lutter
*Assistant Examiner*—Bernard Nozick
*Attorneys*—Bertram H. Mann, Frank B. Pugsley, James G. Ulmer, Delmar L. Sroufe and Robert A. White ABSTRACT: A novel sealing and supporting means for treating trays in fluid-treating apparatus in which the fluid-treating apparatus is comprised of a vessel having ledges on inner walls thereof forming liquid-containing chambers and treating tray structure resting on the ledges and supported thereby. The tray structure has flanges depending into the chambers for forming a liquid seal therewith whereby the ascending fluids are prevented from escaping around the peripheries of the trays. The provision of liquid seals at the peripheries of the trays avoids welding or bolt and gasket seals, facilitating the installation and removal of the trays and reducing construction and maintenance costs.

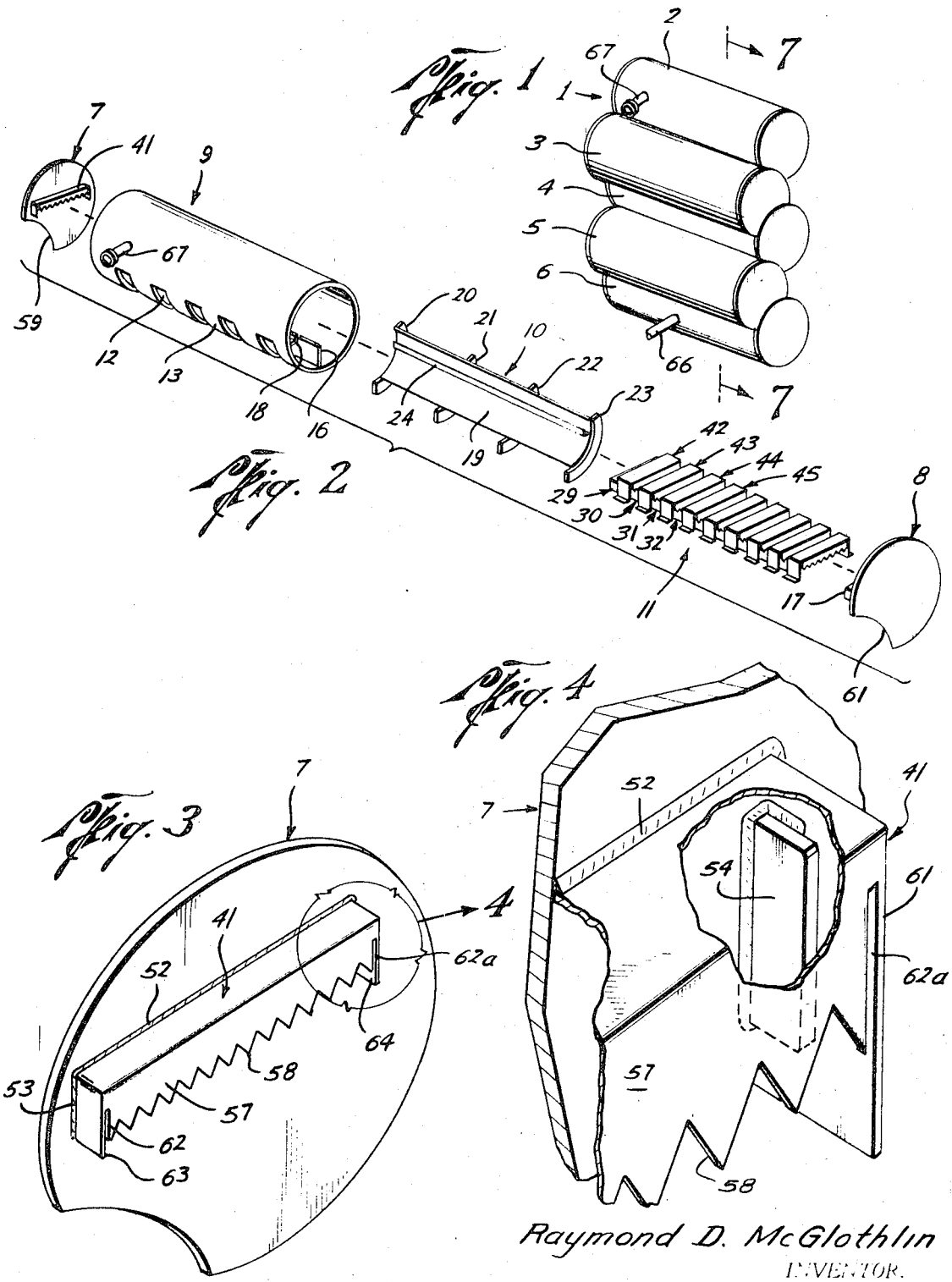

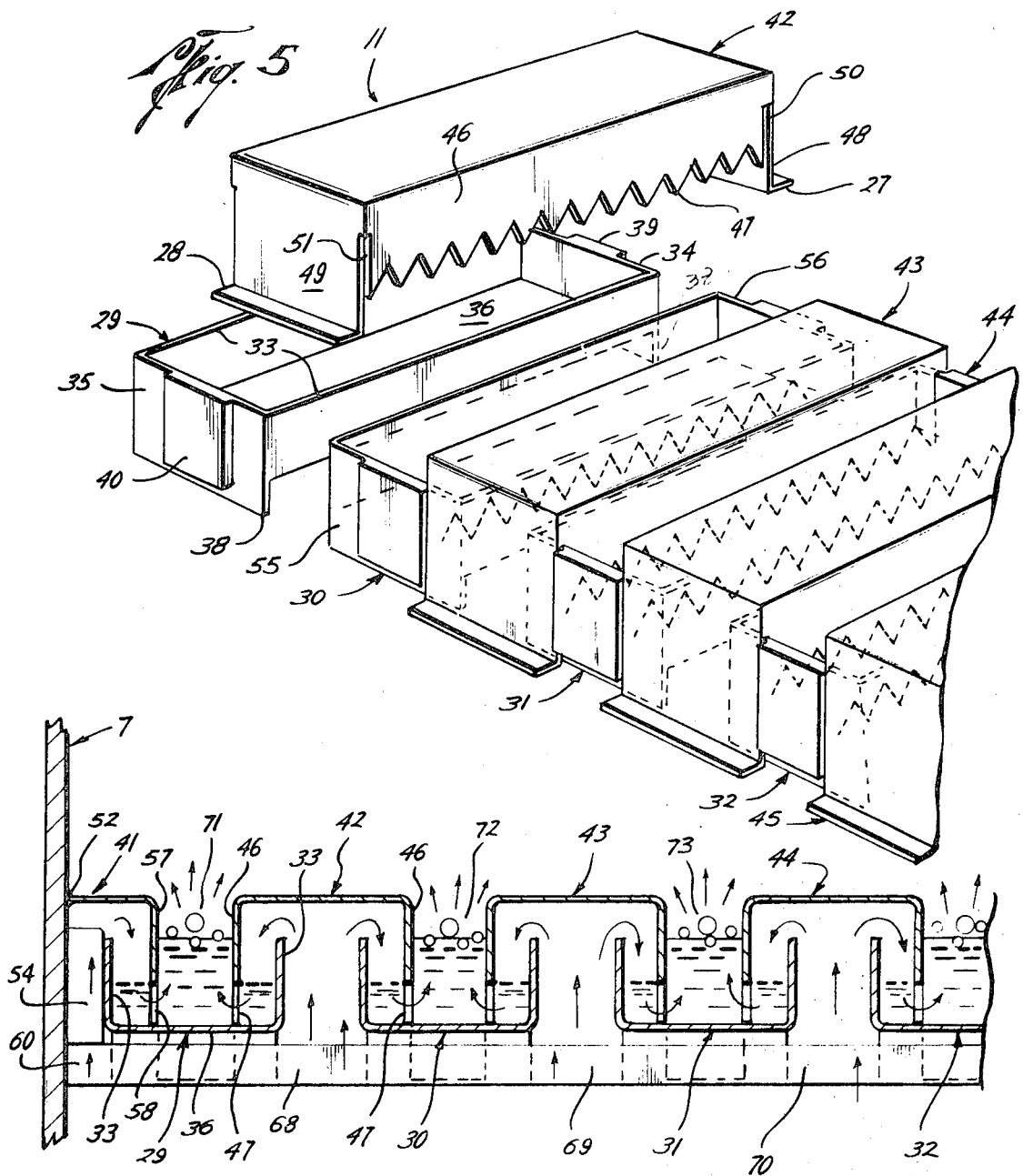

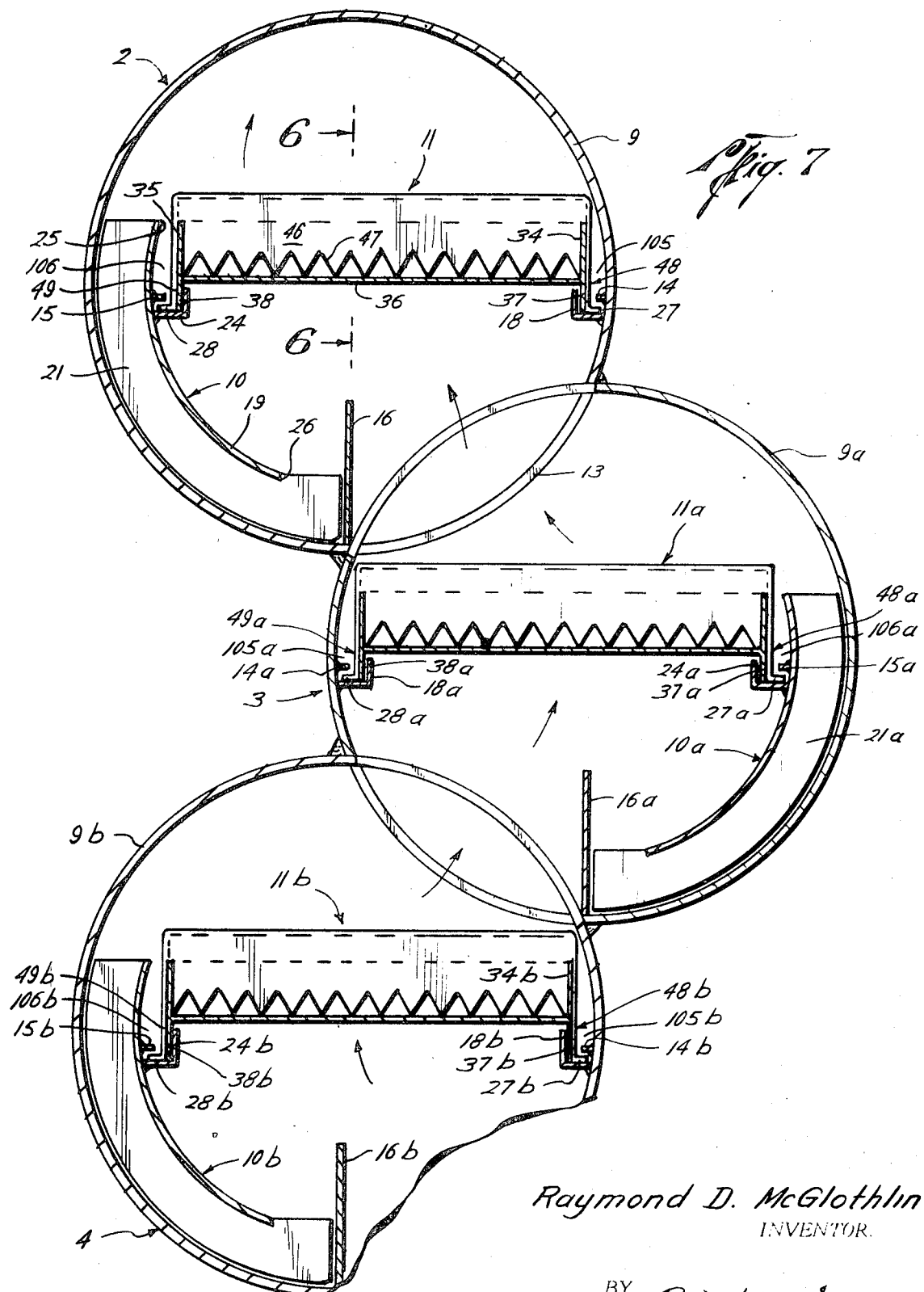

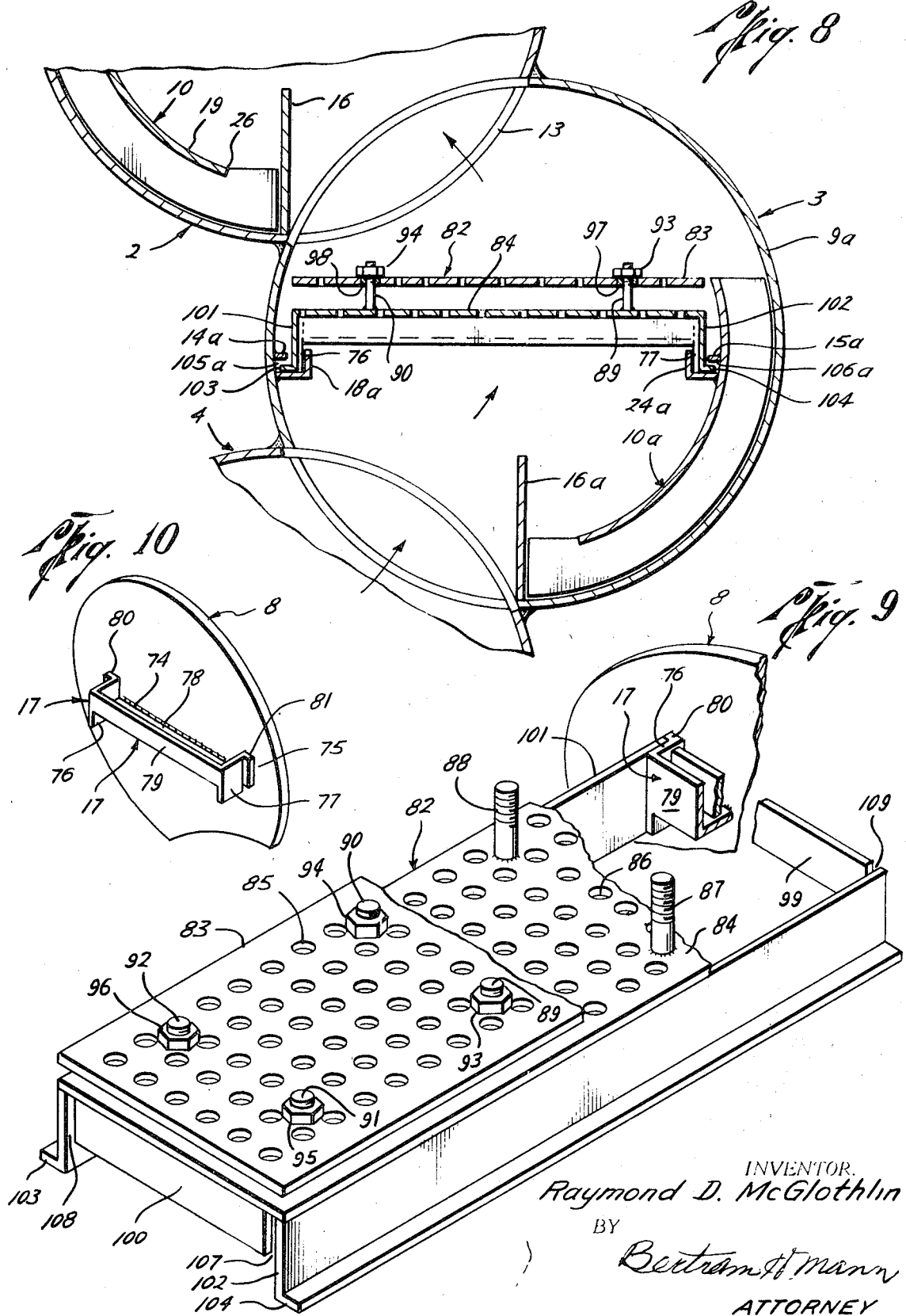

SUPPORTING AND SEALING MEANS FOR TREATING TRAYS IN FLUID-TREATING APPARATUS

BACKGROUND OF THE INVENTION

1. Field of the Invention

This invention relates to fluid-treating apparatus and more particularly to treating trays and supporting and sealing means for said trays.

2. Description of the Prior Art

Fluid-treating vessels are used in fractionating, refining, distilling, separating, extracting, purification, washing, stripping, dephlegmation, dehydration, catalysis, and like operations in which two fluids, a gas and a liquid or two liquids, are brought into intimate contact.

Conventionally in such operations, a heavier, or less volatile, fluid is supported at a predetermined depth on horizontal trays, partially by means of weirs or dams, and the lighter, or more volatile, fluid is caused to bubble or trickle or otherwise pass through the tray-supported fluid. To effect the maximum mass transfer between the two fluids, the openings in the trays are designed to permit the lighter fluid passing therethrough to come into intimate contact with the tray-supported fluid, and this latter fluid, depending on the design, may flow down through the same openings or across the tray to a vertical downcomer or downcomers that direct it to the next lower tray. For the efficient operation of fluid treating vessels, the lighter or ascending fluid must be prevented, or at least substantially so, from seeping upwards at the point of contact between the periphery of each tray and the wall of the fluid treating vessel or the support means affixed thereto. Usually, in order to provide a seal at these points of contact as well as a supporting means for the trays, bolts and packing, such as gaskets, or welding is used to sealingly secure the trays to the wall of the vessel or the support means affixed thereto.

The problem in all such fluid-treating vessels in which bolts and gaskets or welding is used to support and seal the treating trays is the difficulty in installing and removing these trays. For instance, in the initial assembly of fluid-treating vessels, considerable expense is incurred in securing the trays to the vessels. When fluid-treating vessels are shut down and disassembled for cleaning and/or repairing, the difficulty in removing welded or bolted trays from the vessels and reinstalling the trays by the same means increases vessel downtime and maintenance costs. The reduction of the cost of a shutdown is especially important in regard to those fluid-treating vessels which require frequent shutdowns, because of the type of operation and the nature of the fluid materials being processed.

SUMMARY OF THE INVENTION

The present invention has for its primary object the provision of an apparatus which obviates the various problems, as previously noted, of the treating trays and the means for supporting and sealing said trays in fluid-treating vessels. Other objects and advantages of this invention will be apparent from the description and claims which follow.

In accordance with the present invention, treating trays in fluid-treating vessels are supported and sealed in part by means of peripheral flanges on the trays depending into the chambers formed by ledge means on the inner walls of the vessels. Although the depending peripheral flanges of the trays normally rest on the horizontal portions of the ledge means and support the trays thereby, the trays may simply rest on, and be supported by, the upstanding portions of the ledge means. During normal operation of fluid-treating vessels, tray-supported liquid fills the chambers into which the peripheral flanges depend, thereby forming liquid seals. The formation of a liquid seal is the result of the liquid head or pressure of the liquid in each chamber being greater than the pressure drop, caused by the tray itself and the liquid thereon, across the corresponding tray. Thus, the ascending fluid will not pass through the liquid-containing chambers and around the peripheries of the trays but will pass through the openings in the trays and the liquid supported thereon, the path of least resistance.

Without reducing the efficiencies of fluid-treating operations, the use of the sealing and supporting means obtained in accordance with this invention avoids the securing, by welding or the use of bolts and gaskets, of the trays to the inner walls of the fluid-treating vessels or support means affixed thereto. As a consequence, the treating trays can be easily installed and removed, resulting in the substantial reduction of construction and maintenance costs.

In one embodiment of this invention, the fluid-treating apparatus disclosed in McGlothlin U.S. Pat. No. 3,345,049, is modified to avoid welding the treating trays to the inner walls of the horizontal shells which are vertically stacked and laterally interlocked. Being guided by and supported on the chamber-forming ledges secured to the inner walls of the horizontal shells, longitudinal trays with depending support flanges can be slidingly inserted into, and removed from, these shells.

In one form of tray structure that can be used in accordance with this invention, a series of spaced oblong pans, alternately upright and inverted, the latter acting as bubble caps, are frictionally fitted together to form a unitary tray structure that can be easily assembled and disassembled. Another tray structure that can be used is comprised of two horizontal apertured plates, with the top plate which is normally supported by the bottom stationary plate being liftable by the pressure of the ascending fluid but limited in its upward movement by hold-down means. This latter tray structure avoids the problem in the use of valve trays where large excesses of pressure frequently cause the valves to become detached from the trays.

BRIEF DESCRIPTION OF THE DRAWINGS

In the accompanying drawings:

FIG. 1 is an isometric view of a fluid-treating vessel in accordance with the above-mentioned patent.

FIG. 2 is an exploded isometric view of one section of the vessel shown in FIG. 1.

FIG. 3 is an enlarged isometric view of the half bubble cap section and end plate shown in FIG. 2.

FIG. 4 is a further enlarged isometric detail showing the structure encircled in FIG. 3, parts being broken away.

FIG. 5 is an isometric view of the assembled tray structure shown in FIG. 2, partially exploded.

FIG. 6 is a vertical longitudinal section taken substantially on line 6—6 of FIG. 7 and including the sealing relationship with a section end plate.

FIG. 7 is a vertical transverse section taken on line 7—7 of FIG. 1.

FIG. 8 is a view similar to FIG. 7, in part, but showing a modified form of the tray structure.

FIG. 9 is an isometric view of the tray structure shown in FIG. 8, parts being broken away, in particular, to illustrate the sealing relationship between the tray and end plate.

FIG. 10 is an enlarged isometric view of the half pan section and end plate shown in FIG. 2 and 9.

DESCRIPTION OF THE PREFERRED EMBODIMENTS

FIG. 1 shows a fluid-treating vessel, generally designated 1, consisting of a plurality, in this case five, of cylindrical sections 2, 3, 4, 5, and 6. These cylindrical sections are arranged horizontally in a stacked, side-by-side, laterally communicating relationship. Further description of the relationship between the horizontal sections can be found in McGlothlin U.S. Pat. No. 3,345,049.

FIG. 2 shows the component parts of a typical horizontal cylindrical section, in this case top section 2, including end plates or walls 7 and 8, shell 9, combination downcomer and tray support member 10, and tray structure 11. As viewed in FIG. 2, shell 9 has a row of partially circumferential slots 12 forming spaced ribs 13 in the lower left quadrant. The other cylindrical sections are provided with alternately complementary slots and spaced ribs located in quadrature and staggered from side to side so that the sections can be vertically stacked and laterally interlocked as shown generally in FIG. 1. Longitudinal baffle plate 16 projects vertically above the floor of shell 9 for positioning downcomer member 10, within the shell, as will be described. Angle 18 extends along and is secured to the inner face of the shell to form a liquid-containing chamber with the shell, the horizontal flange of the angle forming the bottom wall of the chamber. Also extending along and secured to the inner face of the shell is holddown flange or ledge 14. Outlet pipe 67 is provided in the upper left quadrant.

Downcomer member 10 consists of transversely curved, longitudinal plate 19 and a plurality of, in this case four, transverse spacers 20, 21, 22, and 23 welded or otherwise secured to the convex face of plate 19 and having curved outer edges conforming to the curvature of and slidably receivable in the inner surface of shell 9. An angle structure 24 and holddown flange 15 (FIG. 7) extend along and are secured to the concave face of longitudinal plate 19, abreast of channel structure 18 and holddown flange 14, respectively. Angle 24 forms a liquid-containing chamber with plate 19, the horizontal flange of the angle forming the bottom wall of the chamber. To allow the downflowing liquid to build up on the bottom of the section so as to overflow longitudinal baffle 16 and flow through circumferential slots 12 into the next lower section, curved plate 19 terminates short of the lower ends of the spacers, as at 26 (FIG. 7). Plate 19 extends slightly above angle 24, as at 25.

All of the tray structures are similar, and only tray 11 in top section 9 will be described in detail. Tray structure 11 comprises a series of oblong, upright pans 29–32, etc., and alternate inverted, bubble cap forming pans 42–45, etc., frictionally assembled and substantially diametrically bridging the space between curved plate 19 and the opposing inner face of shell 9. The pans are disposed at equal intervals substantially from end to end of the section. Each upright pan has upstanding sidewalls 33, end walls 34, 35, and a floor, as 36 (also see FIG. 6). The end walls depend beneath the floor, as at 37 and 38, and have thickened central portions, as 39 and 40 (FIG. 5). Bubble cap devices 42–45, etc., have sidewalls, as 46, with lower saw-toothed portions 47, and end walls 48, 49 depending beneath saw-toothed portions 47, as shown, and having outstanding feet 27 and 28. Slots 50 and 51 (FIG. 5) are provided at the ends of sidewalls 46 for frictionally receiving the reduced side portions of end walls 34, 35 of upright pan 29 and end walls 55, 56 of adjacent upright pan 30.

The bubble cap device 41 and the pan device 17 secured, respectively, to end walls 7 and 8 are of approximately half the width of devices 42–45 and 29–32, respectively (measured axially of the vessel), and have open sides for welding to the corresponding section end plates, as at 52–53 and 74–75 (FIGS. 2, 3, and 10). Bracing blocks, as 54 (FIG. 4), are welded in the inside corners between the end plate 7 and end bubble cap device 41 as stops against which the end pan abuts for forming a riser passage 60 (FIG. 6), as will be explained. The sidewall 57 of end bubble cap device 41 is provided with a saw-toothed lower edge 58 and end slots 62 and 62a. End walls 63 and 64 of device 41 depend beneath saw-toothed lower edge 58. End pan device 17 (FIG. 10) has sidewall 79 and end walls 76 and 77 depending beneath floor 78 and having flange 80 and 81.

The parts of the respective vessel sections in descending order are designated by the same reference numerals as in section 9, just described, but with the suffix as a, b, c, d, etc., the tray and downcomer constructions being alternately reversed. In assembling a typical section (FIG. 1), downcomer member 10 is slid endwise into shell 9 with the lower ends of spacer ribs 20–23 bearing against upstanding baffle plate 16. This automatically locates angular ledge 24 at the same level as complementary ledge 18 on the shell inner face. Next, tray structure 11 is inserted endwise into the shell above angular ledges 18 and 24 and with depending end walls 48, 49 of the inverted pans resting on the ledges, as best shown in FIG. 7. Outstanding feet 27, 28 on inverted pan end walls 48, 49 are slidably inserted between holddown ribs or rails 14, 15 and the angular ledges.

Finally, end plates 7, 8, etc., are applied to the shells and secured, as by use of bolts or welding with bracing lugs 54 abutting sidewall 33 of end tray 29 (FIG. 6) and half bubble cap member 41 dipping into this pan. Opposite end plate 8 is also secured in position with half pan forming angle 17 projecting upwardly into the corresponding bubble cap member. While the tray structure may be preassembled, as in FIG. 6, and inserted as a unit, the pans may be individually inserted and frictionally assembled within the shell. In the assembly, all parts of the tray structure are stably held together and properly positioned in the shell, as shown, even during pressured flow of fluids therethrough. Upflow channels are shown at 60, 68, 69, 70, etc., between the upright, liquid-bearing pans and adjacent end wall 7. The inverted pans function as bubble caps to divert the upflowing gases through the liquid on the upright pans for intimate contact therewith. Excess liquid in the upright pans will flow over the end walls 34, 35, etc., thereof into the seal chambers 105, 106, etc., formed by angular ledges 18, 24, etc. (FIG. 7). The depending end walls of the pans dip into liquid trapped in these chambers to prevent the escape of gases therepast. Liquid in ledges 24, 24a, etc., will overflow into downcomer channels between curved walls 10, 10a, etc., and the tank wall, thence over baffles 16, etc., into the next lower section. The ends of the tray structures are sealed by the liquid trapped in small seal chambers formed by angular ledge member 17 at one end and half bubble cap device 41 at the other end.

To disassemble the apparatus, it is simply necessary to remove the end plates at one end of each section, whereupon the tray structures and downcomer members can be slid out of the shells longitudinally, no cutting or unbolting or removal of packing being necessary. Optionally, the pans and bubble cap devices can be removed individually from the shells, if desired.

Modified tray structure 82, shown in FIGS. 8 and 9, comprises bottom plate 84 and top plate 83, both plates having a multiplicity of openings therein, as at 85 and 86. Preferably, the areas of holes 85 in the top plate will be less than the areas of holes 86 in the bottom plate to provide progressive gas release action. Top plate 83 normally rests on bottom plate 84, but is liftable by the pressure of ascending fluid, as indicated in FIG. 8, where it is shown in its uppermost position. A plurality of holddown bolts 87–92, which project through top plate 83 at brushed holes, as 97 and 98, are welded or otherwise secured to bottom plate 84 and have the upper portions thereof threaded for receiving nuts, as 93–96. Welded or otherwise affixed to bottom plate 84 are depending end walls 99 and 100 depending sidewalls 101 and 102, the latter walls extending downward below the former walls and having outstanding walls 103 and 104 at the lower edges thereof. Slots, as 107–109, are provided at each end of depending end walls 99 and 100.

The assembly of modified tray structures 82 in the horizontal sections comprising the vessel shown in FIG. 1 is similar to the assembly operation, previously described, for tray structures 11, 11a, 11b, etc. After novel downcomer structures 10, 10a, etc., have been placed in shells 9, etc., in the assembly of the horizontal sections, as shown in FIG. 8, modified tray structures 82 are inserted endwise into the shells above and along channel structures 18, etc., and 24, etc., with outstanding flanges 103 and 104 being under holddown flanges 14, 15 etc. Depending sidewalls 101 and 102 are designed to dip into the upstanding channel structures which abut at their ends with the section end plates for trapping sealing liquid within the confines of the channel structures. Finally, section end plates, such as 8 (FIG. 9), are applied to the ends of the shell and secured, as by use of bolts or welding, after end pan devices 17, etc., preferably, at both ends, are fitted under depending end flanges 99 and 100 of modified tray structure 82. The interlocking of the end pan devices wit the modified tray is illustrated in FIG. 9 wherein sidewalls 79 of end pan devices 17 fit in the slot at the left end of depending end flange 99 and the flanged ends 80 of sidewalls 79 abut the end of depending tray sidewalls 101.

The tray structures can be easily removed from the horizontal sections by sliding the trays out of the sections longitudinally after first removing the section end plates.

In operation of the assembled treating apparatus, the lighter or ascending fluid is admitted through inlet pipe 66 and rises transversely through the successive horizontal sections, following the tortuous path indicated by the arrows around the pans 29–32, through passages 60 and 68–70, thence through the liquid trapped on the pans and upwardly through passages 71–73 between the bubble cap devices, then through interfitting ribs and slots or other communication between adjacent sections, and so on to the top of the vessel where it egresses through pipe 67. Liquid in the pans overflows the pan end walls 34, 35 etc. (FIG. 7) into seal chambers 105, 105a, 105b, etc., 106, 106a, 106b, etc., formed, as previously described, by channel structures 18, 18a, 18b, etc., 24, 24a, 24b, etc., thereby obtaining liquid seals.

The height of the upstanding portions of channel structures 18, 24, etc., must be sufficient to enable enough liquid to be collected in seal chambers 105, 106, etc., so that the liquid head or the static pressure of the liquid in chambers 105, 106, etc., is greater than the pressure drop across trays 11, 11a, 11b, etc. When liquid seals are thus obtained at the chambers, the ascending fluid will flow through passages 60, 68–70, etc., and the trapped liquid on the pans and passages 71–73, etc., the path of least resistance, rather than under and around the depending end walls 37, 37a, 37b, etc., 48, 48a, 48b, etc., 38, 38a, 38b, etc., and 49, 49a, 49b, etc., and upward through seal chambers 105, 105a, 105b, etc., and 106, 106a, 106b, etc.

When tray structures, as in FIGS. 8 and 9, are used, the ascending fluid follows a tortuous path through the misaligned openings in the two plates. Liquid seals are similarly formed as described above as the liquid on the bottom plate flows into the seal chambers, as 105a and 106a in FIG. 8, and the half pan devices 17, etc.

The invention may be modified in various respects as will occur to those skilled in the art, and the exclusive use of all modifications as come within the scope of the appended claims is contemplated.

I claim:

1. Multiple-fluid intermingling apparatus comprising a vessel having inlet means at the lower portion for fluids including liquid, tray structure transverse of and traversing said vessel for causing intermingling of fluids therein, means on inner walls of said vessel forming spaced opposed liquid-trapping chambers, downcomer means supported within the vessel and supporting one of said chambers, and peripheral flanges on said tray structure depending into said chambers for forming liquid seals therewith and supporting said structure on walls of said chambers, said structure comprising a plurality of upright liquid supporting pans with side and end walls and with spaces between said sidewalls for passing upflowing gases therethrough and intervening inverted pans bridging said spaces, said inverted pans also having side and end walls paralleling the corresponding upright pan walls, said inverted pan sidewalls depending into said upright pans for directing fluids which ascend between said upright pans downwardly through the liquid on said latter pan, said latter sidewall traversing said upright pan end walls and having slots resting on and frictionally gripping the same to secure the assembly.

2. Multiple-fluid intermingling apparatus as described in claim 18 in which said vessel is of generally cylindrical contour with its axis horizontal and further including at least one removable end wall for admitting said tray structure into said vessel and holddown ledges extending along said inner walls immediately above and parallel to said chamber bottom walls, said inverted pan end walls having outstanding feet for slidable reception between said chamber bottom walls and said holddown ledges, said removable end wall when mounted on said vessel cooperating with said chamber bottom walls and said ledges to secure said tray structure in position.

* * * * *